United States Patent [19]
Nicholson et al.

[11] Patent Number: 5,522,266
[45] Date of Patent: Jun. 4, 1996

[54] LOW COST PRESSURE TRANSDUCER PARTICULARLY FOR MEDICAL APPLICATIONS

[75] Inventors: Warren B. Nicholson, Dublin; Charles R. Patzer, Ashville, both of Ohio; Thomas P. Frank, Neenah, Wis.; Dennis M. Tomisaka; Glen D. Brunner, both of Dublin, Ohio; John C. Toomey, Marysville, Ohio; Michael P. Eland, Loveland, Colo.

[73] Assignee: Medex, Inc., Hilliard, Ohio

[21] Appl. No.: 160,035

[22] Filed: Nov. 30, 1993

(Under 37 CFR 1.47)

[51] Int. Cl.$^6$ .................................................. G01L 1/00
[52] U.S. Cl. ............................................ 73/708; 73/754
[58] Field of Search ............................ 73/715, 723, 727, 73/754, 4 R, 708

[56] References Cited

U.S. PATENT DOCUMENTS

| | | |
|---|---|---|
| Re. 33,360 | 10/1990 | Reynolds et al. |
| 3,479,739 | 11/1969 | Stedman et al. |
| 3,496,633 | 2/1970 | Michie et al. |
| 4,072,056 | 2/1978 | Lee . |
| 4,173,900 | 11/1979 | Tanabe et al. ............................ 73/721 |
| 4,311,980 | 1/1982 | Prudenziati . |
| 4,320,664 | 3/1982 | Rehn et al. ............................... 73/727 |
| 4,333,349 | 6/1982 | Mallon et al. ............................ 73/727 |
| 4,462,018 | 7/1984 | Yang et al. ............................ 73/704 R |
| 4,481,497 | 11/1984 | Kurtz et al. . |
| 4,516,430 | 5/1985 | Kurtz et al. ............................... 73/727 |
| 4,589,287 | 5/1986 | Dickens . |
| 4,658,651 | 4/1987 | Le ................................................ 73/727 |
| 4,732,044 | 3/1988 | Dell'Acqua et al. . |
| 4,756,193 | 7/1988 | Luettgen ................................... 73/727 |
| 4,760,730 | 8/1988 | Frank et al. . |
| 4,775,850 | 10/1988 | Dell'Acqua et al. . |
| 4,782,319 | 11/1988 | Dell'Acqua et al. . |

(List continued on next page.)

OTHER PUBLICATIONS

G. Pike, et al., "Electrical Properties and Conduction Mechanisms of Ru–based Thick–Film (Cermet) Resistors", J. Appl. Phys. 48(12), pp. 5152–5169, Dec. 1977.

S. Chitale, et al., "High Gauge Factor Thick Film Resistors for Strain Gauges", from Electro–Science Laboratories, Inc., King of Prussia, PA, 1989.

Material Matters, vol. X, No. 1, pp. 1, 4, Electro–Science Laboratories, Inc., King of Prussia, PA.

"High Temperature Putties", Technical Data Bulletin No. M3, Aremco Products, Inc., Ossining, NY.

"Thick–Film Pressure Sensors: Performance and Practical Applications", European Hybrid Micro–Electronics Conference 1981, Avignon, pp. 121–134, R. Dell'Acqua, et al.

"Changes in Thick–Film Resistor Values Due to Substrade Flexure", Microelectronics and Reliability, Pergamon Press 1973, vol. 12, pp. 395–396.

Patent Abstracts of Japan, vol. 6, No. 18 (P–100) 2 Feb. 1982 & JP, A, 56 140 203 (Toyota Central Res & Dev Lab Inc) 2 Nov. 1981.

*Primary Examiner*—Richard Chilcot
*Assistant Examiner*—Ronald L. Biegel
*Attorney, Agent, or Firm*—Wood, Herron & Evans

[57] ABSTRACT

A pressure transducer (10) for measuring fluid pressure in a fluid path comprising a strain gauge circuit (37) of thick film piezoresistors formed on an alumina diaphragm (36) in a Wheatstone bridge configuration. Each resistance leg of the bridge typically includes a thick film measuring piezoresistor (R1A) to which selected thick film patch-in piezoresistors (R1B, R1C, R1D, R1E) are selectively connected to create a measuring resistance network (PN1). The measuring resistance network is adjusted to a predetermined resistance value to balance and optimize the electrical symmetry of the bridge. The pressure transducer (10) includes a mechanical stop member (46) located adjacent the alumina diaphragm (36) such that the fully deflected diaphragm contacts the stop thereby physically preventing the diaphragm from deflecting an amount that would cause the diaphragm to rupture.

31 Claims, 4 Drawing Sheets

U.S. PATENT DOCUMENTS

| | | |
|---|---|---|
| 4,800,759 | 1/1989 | Hirata et al. . |
| 4,920,972 | 5/1990 | Frank et al. . |
| 4,966,039 | 10/1990 | Dell'Acqua . |
| 5,042,495 | 8/1991 | Spotts et al. . |
| 5,048,531 | 9/1991 | Spotts et al. . |
| 5,107,710 | 4/1992 | Huck et al. ............... 73/721 |
| 5,209,122 | 5/1993 | Matley et al. ............ 73/727 |

LOW COST PRESSURE TRANSDUCER PARTICULARLY FOR MEDICAL APPLICATIONS

BACKGROUND OF THE INVENTION

1. Field of the Invention

The present invention relates generally to the area of pressure transducers and more particularly to pressure transducers for measuring a patient's blood pressure.

2. Description of the Prior Art

Pressure transducer sensor elements are commonly designed to have four resistor legs formed on a yieldable diaphragm area of a sensor element. Typically, a Wheatstone bridge is used in which the resistance in the bridge legs changes in response to pressure applied to the diaphragm. In order for the device to work in an acceptable manner, the resistance value of each of the legs must nominally be the same, and the input and output impedances of the bridge must also meet predetermined criteria. It is in the manufacture of the sensor element to satisfy these concerns that great cost is incurred.

For example, commonly employed sensor elements may be semiconductor devices with the resistive bridge legs formed such as by appropriate doping of selected portions of material in the semiconductor material. In order to "balance" the bridge legs so that they have substantially the same resistance values, serial resistors are added into the bridge legs. Their size is physically trimmed so that the bridge legs have identical resistance values thereby balancing the bridge. Not only are additional manufacturing steps required, but these added balancing resistors introduce variability and instability into the system that is not desirable.

Another form of sensor element may be made by utilizing thick film technology. One example of such a sensor element is made by depositing piezoresistive cermet inks onto a ceramic alumina substrate. The inks are then fired to form piezoresistors which change resistance in response to the alumina substrate being flexed by the pressure forces. These types of sensor elements are less expensive than the semiconductor type, however, there are drawbacks in their electrical characteristics that have heretofore limited their use. The greater unpredictability of the resistance values of the cermet ink materials ensures that significant adjustment of resistance values will be necessary to balance the bridge. Further, when the active measuring resistors of the bridge are physically trimmed, the piezoresistive characteristics of the fired cermet changes and/or deteriorates. To overcome that problem, it is known to connect the pressure transducer with the piezoresistor bridge to an external device which is used to balance and calibrate the bridge with external resistors.

In addition to limitations in their electrical characteristics, the use of thick film piezoresistor sensor elements has been limited because of their more fragile mechanical structure. For example, the volumetric displacement of the alumina is greater than the volumetric displacement of a comparable silicon substrate. Therefore, to maintain the integrity of the mechanical structure of the substrate, the diaphragm flexure should be minimized, and that limitation generally requires that the diaphragm be relatively thick and/or that the diaphragm area be relatively small.

In low pressure applications, such as medical applications, the above described limitations in the electrical and structural characteristics of cermet materials present significant problems. For example, blood pressure transducers are often tied into a fluid line inserted into the vascular system of a patient. The pressure in that line may be subject to very rapid changes which are equivalent to pressure shock waves, and the range of pressure magnitudes in the fluid line is large. For example, the line may be providing fluids intravenously by a gravity drip which normally presents a relatively low pressure, but a deadender may be inserted in the line which creates a relatively short pressure shock wave at a significantly higher pressure. Such a pressure change would normally dictate a smaller and thicker diaphragm. However, in medical applications, there is also a need to measure the fluid pressure with a high degree of accuracy and precision. Therefore, the area of the diaphragm must be sufficiently large to contain all the thick film resistors used in the Wheatstone bridge network; but it must be thin enough to flex sufficiently in order to obtain the necessary discrimination and precision. As a result, pressure shock waves can overflex the diaphragm and cause it to fracture or splinter rendering the pressure sensor useless.

Also, in low pressure applications, the diaphragm of the ceramic alumina substrate is typically thinner and may be porous and may be in constant contact with a saline solution which is often used in medical applications. The fluid pressure may force the saline solution through the alumina diaphragm and into contact with the electric circuits on the opposite side of the diaphragm with undesirable consequences. Therefore, the rigorous demands placed on pressure transducers in medical applications in combination with the inherent electrical and structural limitations of thick film piezoresistor pressure sensor elements have tended to prevent that technology from being utilized for pressure sensors in the medical field.

Blood pressure transducers in use today may be two component devices such as that shown in U.S. Pat. No. 4,920,922. As shown in that patent, one piece of the transducer is a disposable fluid dome that is placed into the fluid line. The other piece is a reusable sensor housing to which the fluid dome mounts to couple pressure of the fluid in the dome to the sensor element within the housing. To maintain isolation between the fluid and the sensor, the disposable dome and the reusable sensor housing each have a diaphragm thereacross. In use, the diaphragms are placed in a contiguous relationship to couple pressure from the dome to the sensor. After use, the dome is removed from the housing and disposed of, while the housing, with the expensive sensor component, is reassembled with a new dome for reuse. It would be desirable to reduce the cost of the sensor component containing the strain gauge so that the entire pressure transducer is disposable.

SUMMARY OF THE INVENTION

The present invention provides a pressure transducer utilizing thick film piezoresistor technology to take advantage of its lower cost but with modifications to the technology that overcome drawbacks previously encountered in utilizing thick film piezoresistor technology for pressure transducers. The invention is especially suited for use in medical applications where disposal of the pressure transducer after each use is desired.

To this end, and in accordance with the principles of the present invention, a pressure transducer includes a transducer element having a strain gauge with at least one thick film pressure measuring resistor and at least one thick film patch-in resistor, both formed on the diaphragm of the transducer element. The diaphragm flexes in response to pressure forces which varies the resistance values of both the pressure measuring and patch-in resistors. The transducer includes output terminals coupled to at least the measuring resistor which provide an electrical output signal varying in relation to the changes in resistance of the pressure measuring resistor. The sensor includes a structure by which to selectively, electrically connect the patch-in resistor(s) to the measuring resistor to form a measuring resistance network such that the electrical pressure signal being monitored is modified without physically altering the resistance values of the measuring and patch-in resistors. The measuring resistance network comprises the active resistance of the pressure sensor and is electrically adjusted without physically altering the piezoresistive characteristics of the thick film measuring and patch-in resistors. The pressure transducer detects changes in pressure of a fluid mechanically coupled to the diaphragm by sensing changes in the resistance values of the thick film resistors in the measuring resistance network. A thick film trimming resistor may be located on a rigid support structure contiguous with the diaphragm and is electrically connected in series with the measuring resistance network to form a series resistance network. The trimming resistor provides for minor, physical trimming of the strain gauge. The pressure transducer may include combinations of the measuring resistance networks and series resistance networks connected in a Wheatstone bridge configuration. In the Wheatstone bridge configuration, everything needed to balance and adjust the sensitivity of the bridge is contained within the pressure transducer and is accomplished as a part of the manufacturing process.

The transducer element is mounted in a fluid path housing thereby exposing the diaphragm and strain gauge formed thereon to fluid in the fluid path, such as, for medical applications. The fluid path housing includes a mechanical stop member having a stop surface extending substantially over the area of the diaphragm. The stop surface is spaced from the transducer element to permit the full range of transducer element deflection under normal pressure variations. But, if the pressure increases so that the transducer element would be caused to deflect beyond the normally expected range, the transducer element contacts the stop surface which mechanically prevents any further deflection of the transducer element to thereby prevent fracture or splitting thereof. One surface of the transducer element including the alumina diaphragm is covered with a flexible liquid barrier to prevent fluid from leaking through the diaphragm.

The construction of the present invention has the advantage of utilizing lower cost thick film cermet resistor technology to make a strain gauge for a disposable pressure transducer that may be put to immediate use without having to adjust or balance the transducer. The pressure transducer has the further advantage of being able to electrically adjust the measuring resistors in the legs of the Wheatstone bridge by creating measuring resistance networks having approximately the same resistance values without physically trimming or changing the size of the measuring piezoresistors or associated patch-in piezoresistors. The invention has the advantage of minimizing the voltage drop across the nonpressure measuring trimming resistors. The invention has the further advantage of providing an electrically symmetrical bridge configuration that does not necessarily require null compensation to compensate for ambient temperature variations. The pressure transducer construction provides a mechanical stop to prohibit the transducer element from rupturing because of excessive fluid pressure.

These and other objects and advantages of the present invention will become more readily apparent during the following detailed description in conjunction with the drawings.

BRIEF DESCRIPTION OF THE DRAWINGS

The accompanying drawings, which are incorporated in and constitute a part of this specification, illustrate an embodiment of the invention and, together with the general description given above, and the detailed description given below, serve to explain the principles of the invention.

DETAILED DESCRIPTION OF THE DRAWINGS

Figure 1:
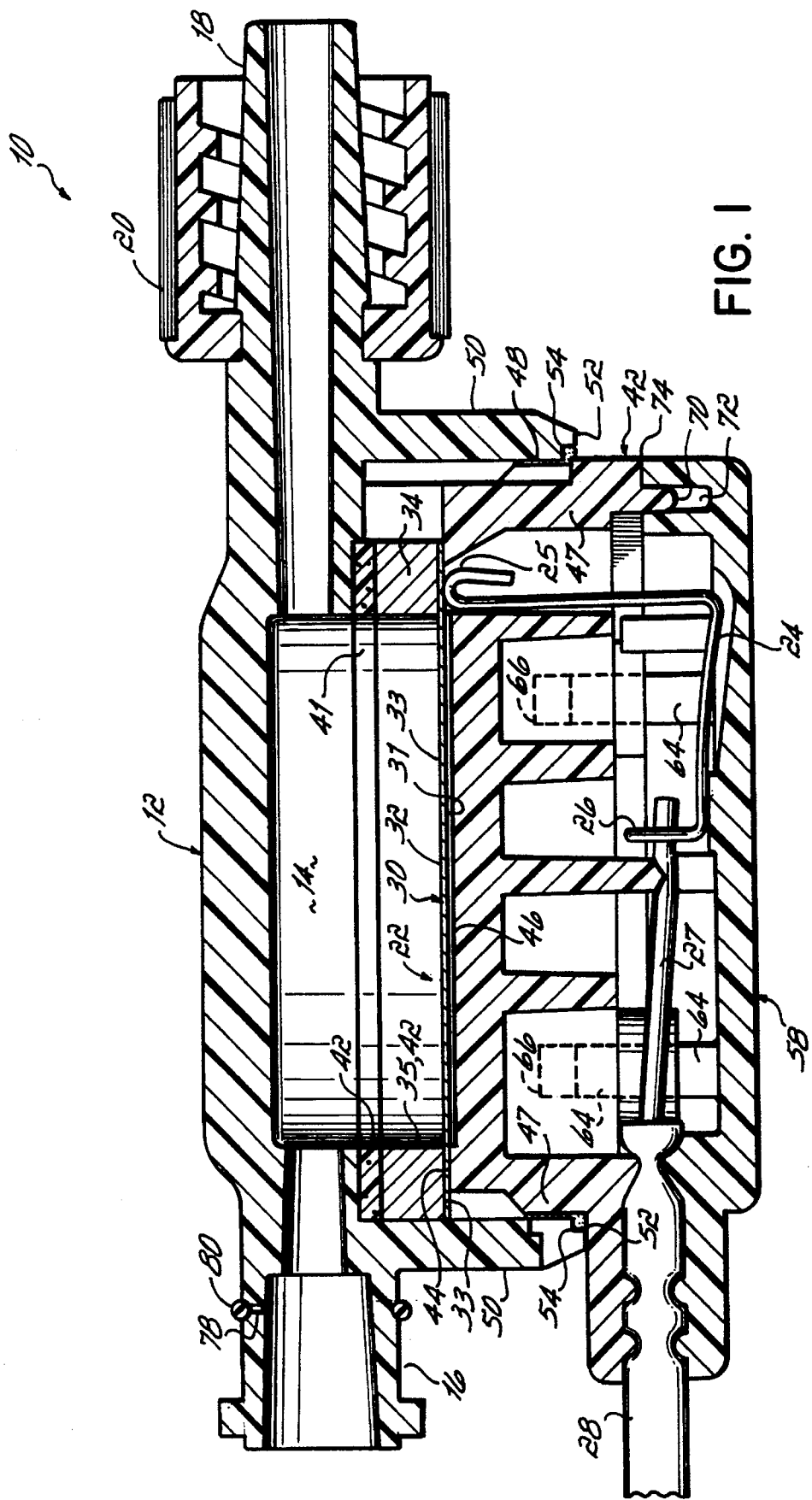
FIG. 1 is a center cross-sectional view of an assembled pressure transducer in accordance with the principles of the present invention.
Figure 2:
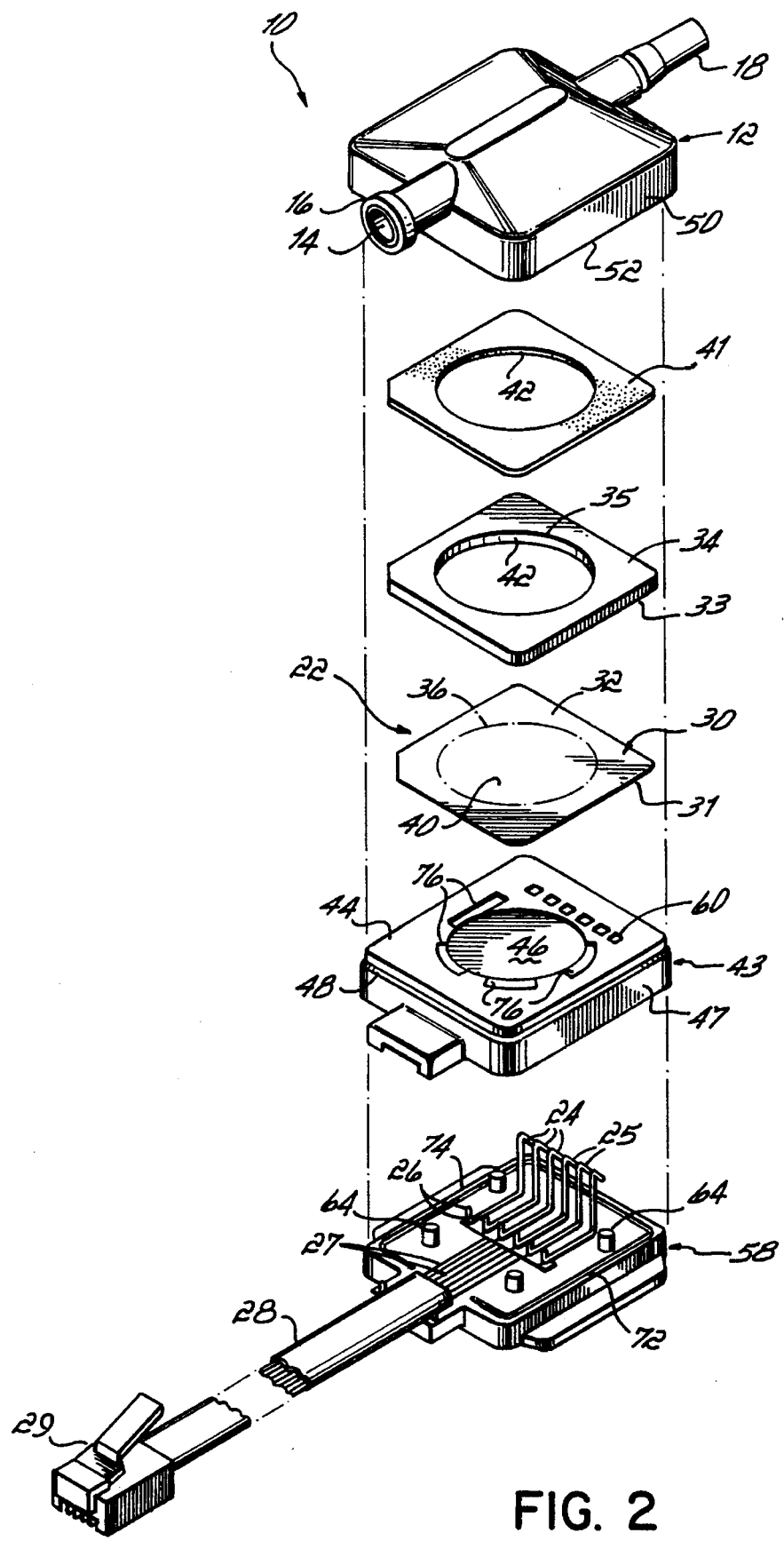
FIG. 2 is a perspective view of the unassembled components of the pressure transducer of FIG. 1.

Referring to the cross-sectional view of FIG. 1 and the disassembled perspective view of FIG. 2, a pressure transducer 10 in accordance with the principles of the present invention is designed for use in medical applications to detect a bodily fluid pressure, for example, blood pressure. The transducer 10 is comprised of a fluid path housing 12 containing a fluid path 14 which exits the fluid path housing 12 by means of connector stems 16 and 18. A Luer fitting, one of which is illustrated at 20, is attached to each of the connecting stems for connecting the pressure transducer 10 to associated tubing or other fluid circuit elements. Fluid flowing through the fluid path 14 of transducer 10 impinges on a pressure sensor, for example, transducer element, 22 containing a strain gauge made from a printed circuit of piezoresistive thick film cermet resistors in a Wheatstone bridge configuration. Power to the Wheatstone bridge is provided by electrical conductors at 24 having one end 25 in contact with circuit elements on the transducer element and another end 26 connected to wires 27 bundled within a cable 28. The cable 28 terminates with an electrical connector 29. The electrical connector 29 is adapted to interconnect with a standard commercial device (not shown), which is effective to supply power through the cable 28 and electrical conductors 27 and electrical contacts 24 to the Wheatstone bridge and receive output signals therefrom such as a voltage signal which is directly correlated to fluid pressure in the fluid path 14. In a manner well known, that external device converts the voltage signal into a representation of fluid pressure either as a numeric or graphic display.

One feature of the present invention is that the construction of the pressure sensing transducer element 22 is comprised of a thin, flexible substrate 30, such as ceramic alumina, having one side 31 containing the strain gauge. The opposite side 32 of the alumina substrate 30 is connected to one side 33 of a thick rigid support member 34 which may also be ceramic alumina. The alumina support member 34 contains a centrally located hole 35 which exposes a circular center portion of the opposite side 32 of the alumina substrate 30 to fluid in the fluid path. Fluid pressure is effective to push or deflect the exposed circular center portion of the alumina substrate 30 away from the fluid path housing 14. The circular center portion of the substrate 30 which is bounded by the center hole 35 of the alumina support member 34 and which is subject to deflection by the fluid pressure is referred to as diaphragm 36. The portion of the substrate 30 contiguous with and contacting the support member 34 is also considered to be and is referenced as part of the support member 34.

Figure 3:
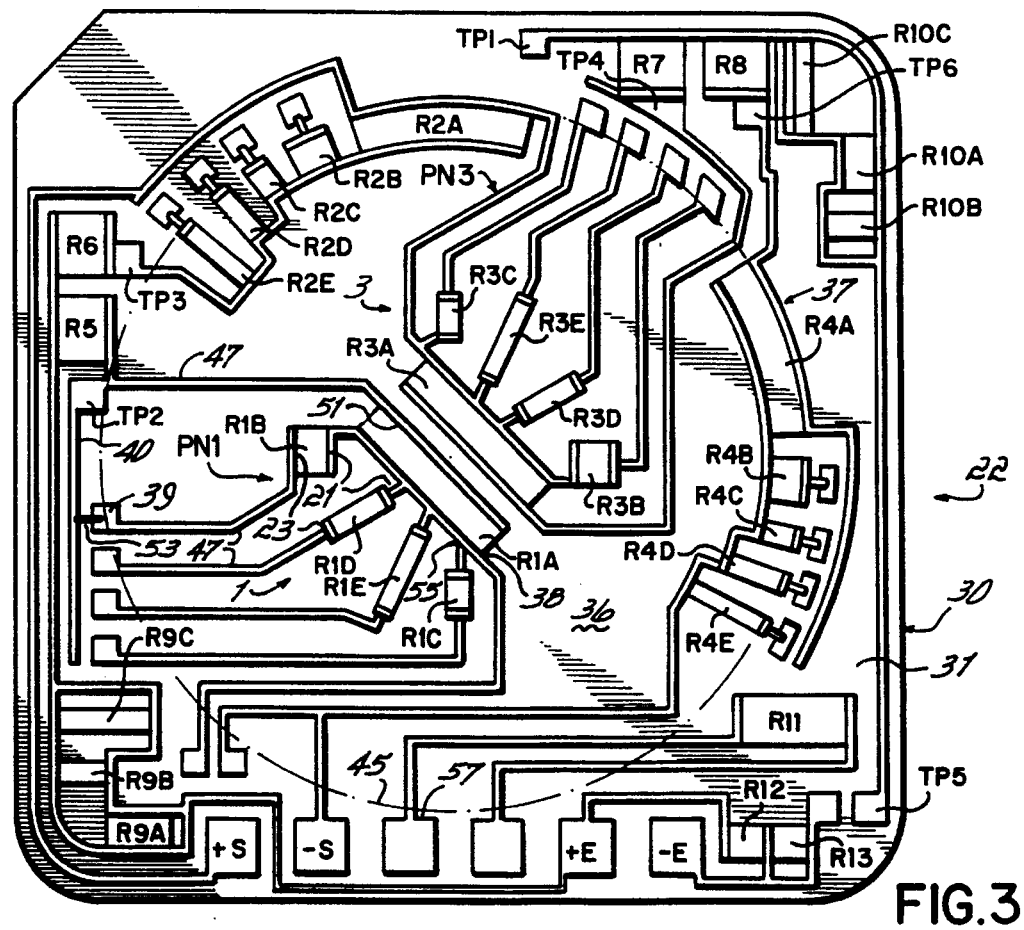
FIG. 3 is a bottom plan view of the transducer element of FIG. 2 illustrating the physical layout of the electrical circuit of the transducer element including the strain gauge circuit.
Figure 4:
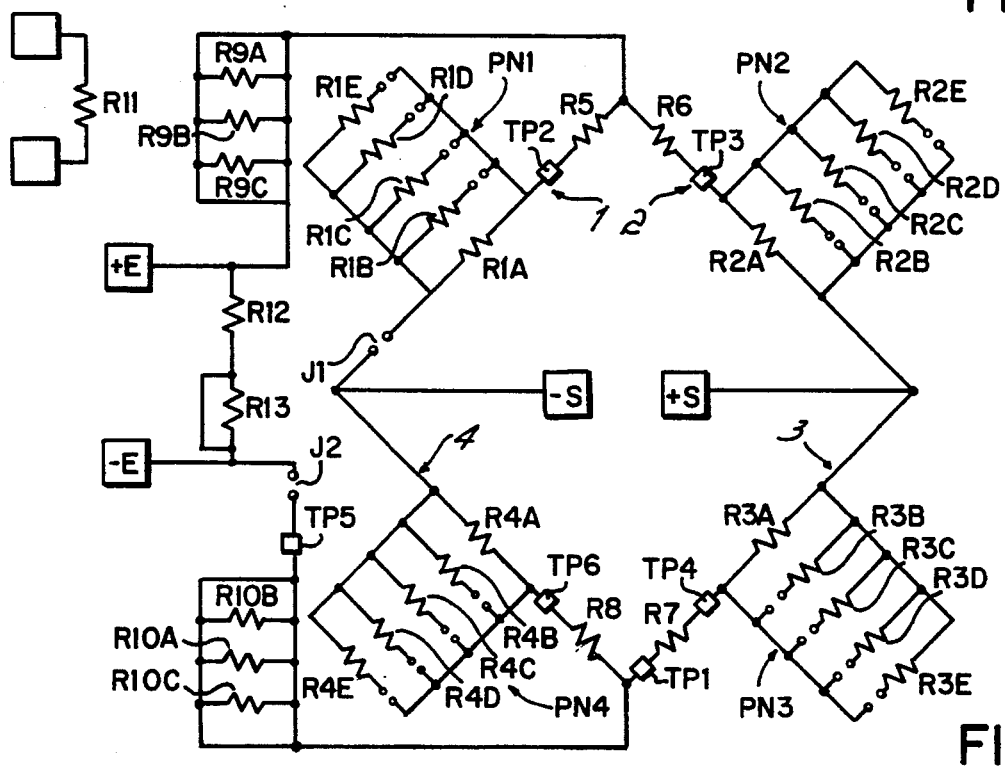
FIG. 4 is a schematic electrical diagram of the transducer element circuit shown in FIG. 3 including the strain gauge circuit connected in a Wheatstone bridge configuration.

FIG. 3 is a bottom plan view of the transducer element of FIG. 2 illustrating the physical layout of the electrical circuit of the transducer element 22 including the strain gauge circuit 37 within the diaphragm 36 which is shown within the phantom line 45 on the transducer element 22. FIG. 4 is a schematic electrical diagram of the circuit of the transducer element 22 shown in FIG. 3 including the strain gauge circuit 37 which is connected in a Wheatstone bridge configuration. The transducer element 22 is manufactured by depositing (e.g., printing) on the alumina substrate 30 conductors 47 of a palladium silver cermet ink. The areas 55 of the conductors 47 which border and lie under the measuring resistors and the contacts areas 57 of the conductors 47 are also printed with a gold cermet ink. Thereafter, a piezoresistive cermet ink is deposited to form the resistors in the circuit of the transducer element 22. The cermet inks are fired in accordance with known practices. The edges of the resistors lie over the gold areas 55 of the conductors 47. The strain gauge circuit 37 of the transducer element 22 includes four electrical strain gauges which are interconnected to form the four legs of a Wheatstone bridge. Each of the four bridge legs 1, 2, 3, 4 include at least one measuring piezoresistor R1A, R2A, R3A, R4A functioning as a strain gauge. Each bridge leg should desirably have the same predetermined resistance. Since the thick film resistors can only be manufactured to within ±20% of their desired nominal value, for example, after the resistors have been manufactured, the resistance of each of the measuring resistors is adjusted to as close as possible to the desired resistance value.

To overcome the previously described problems resulting from physically trimming the thick film measuring resistors, the present invention provides at least one, but advantageously a group of, patch-in resistors associated with each measuring resistor to form a resistor measuring network. Each group of patch-in resistors is the same. For example, referring to bridge leg 1, the patch-in resistors include thick film piezoresistors R1B, R1C, R1D, R1E having one side 21 electrically connected by conductors 47 on the diaphragm 36 to one side 38 of measuring resistor R1A. The opposite side 23 of each of the patch-in resistors R1B, R1C, R1D, R1E, is connected by conductors 47 on the diaphragm 36 to a respective conductive contact 39 located over the support member 34 outside the area of the diaphragm 36. An opposite side 51 of measuring resistor R1A is connected by a conductor on the diaphragm 36 to a conductive contact leg 40 located over the support member 34. By placing conductive jumpers 53 between selected ones of the contacts 39 and the contact leg 40, the patch-in resistors R1B, R1C, R1D, R1E, are selectively, electrically connected in parallel with the measuring resistor R1A. The conductive jumpers 53 may be a conductive polymer commercially available from Minico/Asahi Chemical, of Congers, N.Y. The conductive polymer is cured at a curing temperature below the firing temperature of the thick film resistors. By locating the contacts 39, 40 over the support member 34, the jumpers 53 may be attached and removed without disturbing the electrical characteristics of the piezoresistors in the measuring resistance network.

Continuing with the reference to bridge leg 1, the group of patch-in resistors function as optional supplemental measuring piezoresistors that are selectively combined with measuring piezoresistor R1A to create a measuring resistance network PN1 which functions as a strain gauge. Therefore, the bridge leg 1 is electrically adjusted to be relatively close to its desired predetermined resistance value without physically altering the piezoresistive characteristics of the measuring and patch-in resistors. The resistance values of R1A, R1B, R2C, R1D, R1E are selected such that they can be electrically combined to provide a collective resistance for PN1 that is, for example, 90%±5% of the design resistance value for the bridge leg. With the above network, thick film resistors that are individually manufactured to within ±20% of their nominal resistance value are adjusted to form a measuring resistance network that is within approximately ±5% of a desired network resistance value. To obtain the remaining desired resistance for bridge leg 1, a small trimming resistor R5 may be provided in series with the measuring resistance network PN1 to form a series resistance network. Resistor R5 is desirably formed of a deposited cermet ink and is located outside the area of the diaphragm so as to be generally insensitive to the measured pressure. In other words, the resistance value of the trimming resistor R5 remains relatively constant in response to flexure of the diaphragm. The design print resistance value for R5 is selected so that R5 may be trimmed to, for example, 5.4% of the design resistance value of the bridge leg. Consequently, resistor R5 may then be used to adjust upwardly the resistance value of the series resistance network of bridge leg 1 to the desired predetermined resistance. Therefore, the desired resistance value of bridge leg 1 is achieved while ensuring that the piezoresistive characteristics of the measuring and patch-in resistors are not altered or deteriorated and further ensuring that a minimum voltage drop is desirably maintained across the series trimming resistor.

With the above structure and electrical adjusting process, measuring resistance networks PN1, PN2, PN3, PN4 for each respective bridge legs 1, 2, 3, 4 are created by selectively connecting the groups of patch-in resistors R1B, R1C, R1D, R1E; R2B, R2C, R2D, R2E; R3B, R3C, R3D, R3E; R4B, R4C, R4D, R4E; with respective ones of the measuring resistors R1A, R2A, R3A, R4A. Thereafter, the trimming resistors R5, R6, R7, R8 of each of the bridge legs 1, 2, 3, 4 are physically trimmed to adjust the resistance of the series resistance network of each of the bridge legs 1, 2, 3 4 to the desired predetermined resistance value. As described above, the resistance values of the measuring resistance networks are adjusted close to the desired bridge leg resistance;and therefore, each of the respective series trimming resistors R5, R6, R7, R8 can be made small with relatively little voltage drop. The trimming resistors R5, R6, R7, R8 are formed on a non-yieldable portion of the transducer element 22 outside the area of the diaphragm 36. Therefore, the trimming resistors R5, R6, R7, R8 are isolated from deflections of the diaphragm, and their resistance is constant during the operation of the strain gauge.

The design impedance of the bridge is a function of many factors including the application, associated equipment, industry standards, etc. The bridge must be designed so that it has the sensitivity required by the application. Further, to maintain the desired sensitivity, the maximum voltage drop must be maintained across the measuring resistance network, therefore, the design impedance will dictate the values of the measuring, patch-in and series resistors. For the present invention, the design impedance, i.e., the desired predetermined resistance value, for each bridge leg network is 350 ohms. Given that the design resistance value for each measuring resistance network is, for example, 90%±5% of the design resistance of the bridge leg, then each measuring resistance network has a resistance value of not less than about 298 ohms and not more than about 333 ohms. Given that the trimming resistor has a design print resistance value of, for example, 5.4%, then each trimming resistor has a nominal resistance value of not more than about 19 ohms before trimming. Therefore, the total resistance value of the measuring, patch-in and trimming resistors of the series resistance network in each bridge leg is about 350 ohms.

As illustrated in FIG. 4, the strain gauge circuit 37 has contacts comprised of test points TP1, TP2, TP3, TP4, contacts for jumpers J1, J2, input terminals +E, −E and output terminals +S, −S. Using the above contacts, various procedures may be used to calibrate each of the bridge legs. For example, in one procedure, the resistance values of the measuring, patch-in and trimming resistors are measured, and the potential measuring network resistance value in each bridge leg is calculated for every possible combination of patch-in resistors. Next, given the measured values of the series resistors, a combination of patch-in resistors is chosen which provides a bridge leg resistance which is closest to the design value and which, if required, can be brought closer to the desired value by physically trimming the series resistor. The bridge leg adjusted first is the one to which the resistance values of the other bridge legs can be most closely adjusted and trimmed. The above processes can .be automated wherein the resistance measurements, the calculations of the measuring resistance network and bridge leg resistance values, the selection of the patch-in resistors, the application of the conductive jumpers and the physical trimming of the series resistors with laser trimming or abrading techniques are accomplished under the control of a programmed computer.

After the resistance adjusting and trimming processes are completed, conductive jumpers are connected across the contacts of junctions J1 and J2 which are effective to complete the bridge circuit. At this point, the sensitivity of the pressure transducer is calibrated. The output signal from outputs +S, −S, must have a predetermined sensitivity relative to an input pressure so that the output signal may be used to produce accurate representations of pressure using commercial off-the-shelf equipment. An industry standard for the sensitivity of a pressure transducer output signal in medical applications is 5 microvolts/volt/millimeter of mercury ($\mu$v/v/mm Hg). The sensitivity of the bridge is calibrated by connecting the bridge circuit to a reference source of fluid pressure, for example, 100 mm Hg, and measuring changes in the output voltage signal in response to predetermined fluid pressure changes. If the sensitivity is too high, the value of a sensitivity resistance in series with the bridge is calculated which would provide the desired sensitivity. That sensitivity resistance value is divided in half; and the sensitivity resistors in each of the sensitivity resistor networks R9A through R9C and R10A through R10C are selectively connected together and/or physically trimmed so that each sensitivity network has a resistance value equal to half the sensitivity resistance value. The sensitivity resistance networks are designed to have a range of resistance values of from zero to about 340 ohms. Equal sensitivity resistance networks are connected to both sides of the bridge to maintain symmetry.

The utilization of the sensitivity resistors to reduce bridge sensitivity also changes the resistance of the bridge as measured across the external power supply. To compensate for that, the resistors R12 and R13 are selectively connected in series and are connected in parallel across the power supply terminals. R12 and R13 are selectively physically trimmed to reduce the terminal impedance back to the design impedance value. The above sensitivity adjustments may also be automated. A 16,000 ohm calibration resistor R11 is connected in series with an external 150,000 ohm resistor and connected to the +E and +S terminals to electrically simulate a pressure input. The calibration resistor R11 is trimmed so that the series load simulates an input pressure of 100 mm Hg. The calibration process is described in detail in U.S. Pat. No. 4,760,730 issued to the assignee of the present invention, and the disclosure of which is fully incorporated herein by reference.

The above described processes create a strain gauge in a Wheatstone bridge configuration that is electrically symmetrical, that is, the resistance value of each of the legs is as close as possible to the same predetermined value. Electrical symmetry is also considered in adjusting the bridge sensitivity. Not only is electrical symmetry important, but physical symmetry of the thick film piezoresistors on the substrate 30 is also important. Referring to FIG. 3, the opposing measuring resistance networks PN1 and PN3 are located at the center of the diaphragm 36. Within each of the measuring resistance networks, the group of patch-in resistors is located on the diaphragm adjacent its respective measuring resistor. Those measuring resistance networks are identical in physical size and symmetrical about the diaphragm center. Consequently, those parallel resistance networks PN1 and PN3 are subject to theoretically identical stresses as the diaphragm deflects in response to fluid pressure; and the voltage drop across the series resistance networks of bridge legs 1 and 3 should be identical. Further, since each bridge leg is as close as possible to the same resistance value, the voltage signal produced on the output terminals +S, −S will be an accurate representation of resistance changes in the bridge caused by changes in fluid pressure.

The physical symmetry of the bridge is further enhanced by the resistance networks PN2 and PN4 of the opposing respective bridge legs 2 and 4, being located on the outer edge of the diaphragm adjacent the support member 34. Therefore, the bridge legs 2, 4 will experience theoretical identical resistance changes in respective measuring resistance networks PN2, PN4. The physical layout and location of the components of the transducer element on the outer edge and at the center of the diaphragm is also important to minimize thermal effects. The transducer element 22 is designed to minimize the effects of temperature gradients across its surface. If the steady state temperature gradient across the surface of transducer element 22 can be maintained relatively constant regardless of changes in ambient temperature and changes in current flow through the bridge, then the effects of a change of temperature are neutralized; and temperature compensation such as null compensation is not required.

The measuring resistors and parallel patch-in resistors in all of the bridge legs are made from a relatively high gauge factor ink. Gauge factor is a measure of the change in resistance per unit change in the area of the resistor caused by strain in the substrate on which resistor is formed. In other words, gauge factor is a measure of the sensitivity or change of resistance of the piezoresistor in response to pressure causing the diaphragm to flex, thereby changing the physical size, or area, of the piezoresistor. Therefore, using a higher gauge factor will increase the sensitivity; however, as the gauge factor increases, the thermal stability of the resulting thick film resistor decreases. Reducing the thermal stability of the device may require the use of thermal compensation resistances which adds complexity and cost to the bridge circuit. In addition, the gauge factor of the measuring and patch-in resistors should be higher than the gauge factor of the series and other resistors in the bridge circuit which should be designed to experience less change in resistance in response to the fluid pressure. Therefore, a gauge factor must be chosen that provides the highest sensitivity without unreasonable reductions in the thermal stability of the bridge. With the present invention, the gauge factor of the measuring resistors and the patch-in resistors formed on the diaphragm 36 is approximately 19±1. The gauge factor of the other resistors in the bridge circuit should be as small as possible; and with the present invention, the gauge factor of the trimming resistors, the sensitivity and calibration resistors all of which are located outside the area of the diaphragm 36 on the support member 34 is approximately 4±1. Those resistors have very stable resistance values; and to the greatest extent possible, they represent constant resistance values. In contrast, the measuring resistors and associated plurality of patch-in resistors are very sensitive to fluid pressure changes and produce the major portion of the voltage drop in each of the serial bridge leg circuits.

The measuring resistors R1A, R2A, R3A, R4A have a nominal print resistance value of 440 ohms. The patch-in resistors R1B, R2B, R3B, R4B have a nominal print resistance value of 1,600 ohms; patch-in resistors R1C, R2C, R3C, R4C have a nominal print resistance of 2,700 ohms; patch-in resistors R1D, R2D, R3D, R4D have a nominal print resistance of 5,600 ohms; and patch-in resistors R1E, R2E, R3E, R4E have a nominal print resistance value of 10,200 ohms. All of the measuring resistors and all of the patch-in resistors are manufactured from a cermet ink having a sheet resistivity of 4,000 ohms per square. The series trimming resistors R5, R6, R7, R8 have a nominal print resistance value of 19 ohms. The sensitivity resistors R9A, R10A have a nominal print resistance value of 12 ohms, the sensitivity resistors R9B, R10B have a nominal print resistance value of 24 ohms; and the sensitivity resistors R9C, R10C have a nominal print resistance value of 77 ohms. All of the series trimming resistors and all of the sensitivity resistors are manufactured from a cermet ink having a sheet resistivity of 30 ohms per square. The impedance matching resistors R12, R13 have a nominal print resistance value of 475 ohms and are manufactured from a cermet ink providing a sheet resistivity of 1000 ohms per square. The calibration resistor has a nominal print resistance value of 16,000 ohms and is manufactured from a cermet ink producing a sheet resistivity of 10,000 ohms per square.

As previously generally described, the above strain gauge circuit is printed on the one side 31 of the alumina substrate 30 which is connected to an alumina support member 34. The substrate 30 is approximately a one inch square of alumina which is 0.009 inches thick. The support member 34 is a one inch square of alumina which is 0.100 inches thick with a center hole 35 having a diameter of 0.800 inches, thereby providing a diameter of the diaphragm of 0.800 inches. The substrate 30 and support member 34, shown in FIG. 2, may be bonded together by adhesives or the like. One such adhesive may be a thixotropic organic paste material such as PYRO-PUTTY™ adhesive, type 656, available from Aremco Products, Inc., of Ossining, N.Y. The adhesive is cured at a temperature below the firing temperature of the thick film resistors. The adhesive should minimize extraneous stress forces on the substrate arising from the bonding material adhering to the substrate 30 and the support member 34. Alternatively, the components shown as the substrate 30 and support member 34 may be molded, pressed and fired as a monolithic part.

Referring to FIGS. 1 and 2, after the substrate 30 containing the strain gauge circuit 37 and the support member 34 are assembled into a transducer element 22, the transducer element 22 is mounted in the fluid path housing 12. During use, the pressure transducer will not only measure forces applied by the fluid pressure, but the output signal from the strain gauge will reflect forces created by internal stresses that are mechanically transmitted from the housing members to the transducer element 22. For example, handling of the pressure transducer 10 during use should not result in forces being transmitted to the transducer element 22. Therefore, the pressure transducer 10 must be isolated from external forces that are transmitted through the pressure transducer housing members. Complete physical and force isolation is not reasonably possible; however, to minimize the exposure of the transducer element to external forces, a spacer 41 comprised of a closed cell acrylic foam with pressure sensitive adhesive on both sides is used to mount the transducer element 22 to the fluid path housing member 12. A SCOTCH® VHB 4930 series product available from 3M is a suitable force absorbing material for the spacer 41.

To facilitate assembly of the transducer element 22 into the fluid path housing member 12, a common corner of the substrate 30, the support member 34 and the spacer 41 is chamfered. The fluid path housing 12 contains a fluid path cavity in the fluid path 14 having a cross-sectional area matching the cross-sectional area of the diaphragm 36. Further, the fluid path housing 12 has an internal peripheral shoulder adjacent a second internal cavity having a shape matching the periphery of the transducer element 22. The second cavity and shoulder receive and support the transducer element 22 in proper alignment with respect to the fluid path 14 in the fluid path housing 12. Proper alignment is required so that the contacts 57 on the transducer element are oriented to contact the electrical conductors 24.

During use, the opposite side 32 of the substrate 30 is exposed to fluid in the fluid path 14. The transducer element 22 is $Al_2O_3$ alumina substrate commercially available from Kyocera America Inc. of DesPlaines, Ill. Depending on the techniques used to manufacture the diaphragm and the diaphragm design, the alumina diaphragm may be porous; and therefore, there is some potential that the pressure of the fluid in the fluid path 14 may force fluid through the alumina substrate 30. Fluid forced through the alumina diaphragm 36 could interfere with the electrical connections and circuits of the strain gauge printed on the one side 31 of the substrate 30. To prevent that potential for fluid seepage, the surfaces 42 on the spacer 41, the support member 34 and substrate 30 are coated with a flexible liquid barrier. For example, a thin impermeable layer of a medical silicone gel system, Part No. Q7-2218 available from Dow Corning which is then cured, or a vapor deposition layer of PARYLENE®, or a UV curable silicone based elastomer.

Figure 5:
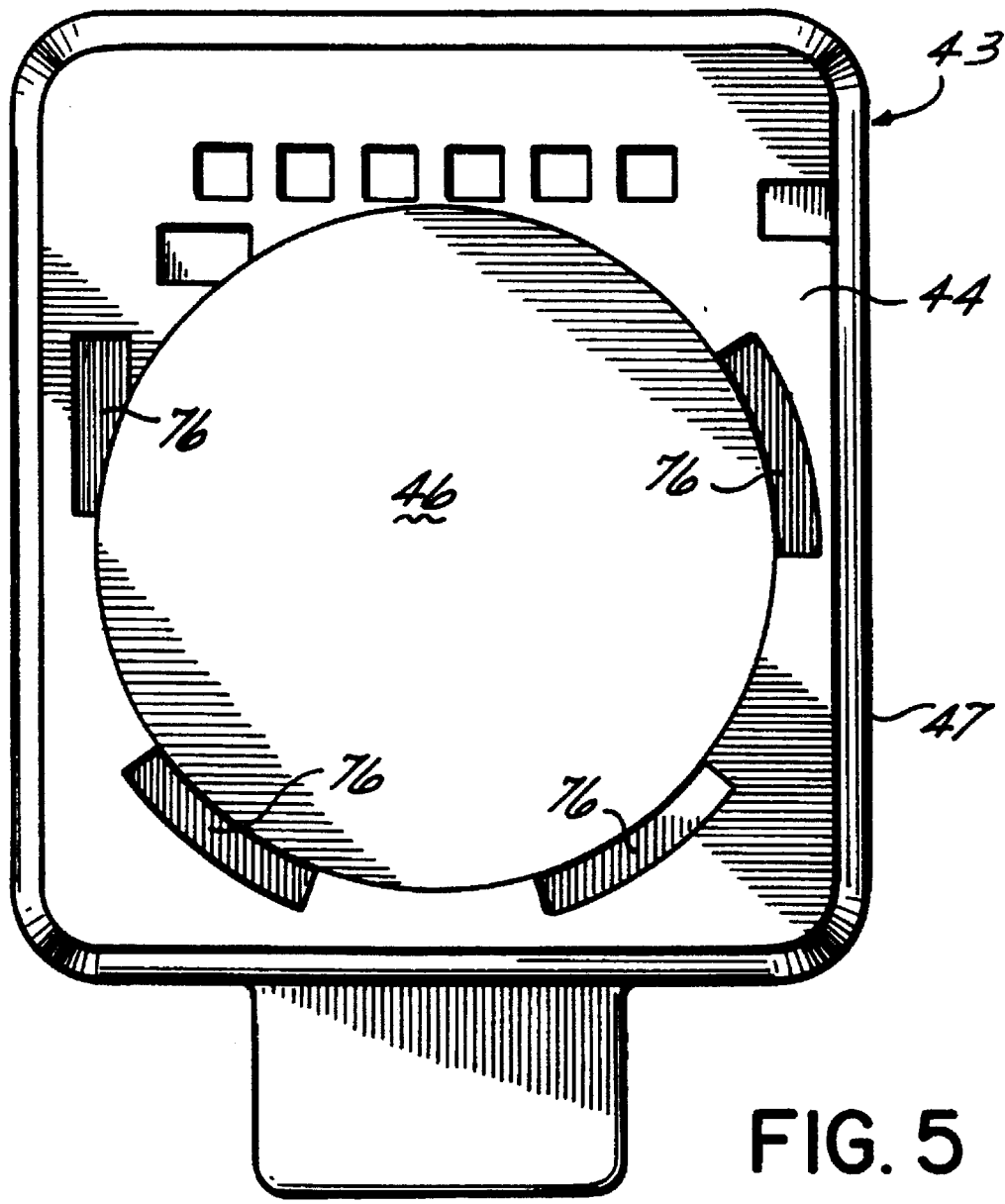
FIG. 5 is a top view of the mechanical stop member of FIG. 2.

In order to accommodate the bridge circuit of the present invention and provide the desired sensitivity, the alumina diaphragm on the substrate 30 is relatively large and thin; and therefore, in responding to fluid pressures, the diaphragm 36 has a relatively large volumetric displacement. When used as a blood pressure monitor, the pressure transducer 10 is designed to operate in a pressure range of from −30 mm Hg to +300 mm Hg; however, the application of a deadender to the line may result in a pressure in excess of +4,000 mm Hg. To protect the diaphragm 36 from excessive deflections caused by overpressure conditions during use which would normally result in the diaphragm rupturing, a mechanical stop member 43 is connected to the fluid path housing member 12. Referring to FIG. 5, the mechanical stop member 43 has one side 44 which is adjacent an opposite side of the substrate 30 of transducer element 22 when the mechanical stop member 43 is connected to the fluid path housing member 12. The one side 44 has a circular recessed area, or well, 46 which has a depth permitting the diaphragm to deflect through its full range of normal operation, for example, 0.001 to 0.00.2 inches. However, the recessed area 46, which is nominally 0.002 inches deep, functions as a mechanical stop, or stop surface to limit flexure of the diaphragm 36 of the transducer element 22. Surface 46 has a slightly concave shape to conform to the shape of the deflected diaphragm 36. Therefore, pressure shock waves which would normally cause an unprotected diaphragm to fracture from excess deflection, push the diaphragm 36 of transducer element 22 into contact with the mechanical stop member 43 prior to the point of fracture of the transducer element 22, thereby protecting the transducer element from damage.

In assembling the mechanical stop member 43 to the fluid path housing member 12, an adhesive is applied along the perimeter of the mechanical stop member as shown by the glue line 48 (FIG. 2). The sidewalls 50 have a peripheral lower edge 52 with a peripheral step or notch 54 on an inner directed side of the peripheral lower edge 52. As the fluid path housing member 12 is slidingly engaged over the outside walls 47 of the mechanical stop member 43, the inner peripheral edge with notch 54 is effective to capture and retain the adhesive applied along the line 48. That adhesive connection is effective to keep adhesive away from and off of the one side 31 of the substrate 30. Any adhesive touching the transducer element 22 could mechanically couple the transducer element 22 to the pressure transducer housing and make the transducer element 22 susceptible to housing stresses caused by external forces.

When the mechanical stop 43 is fully engaged with the fluid path housing 12, the one side 44 of the mechanical stop 43 is in contact with the one side 31 of the substrate 30 of the transducer element 22. To minimize the probability that such contact will interfere with the electrical bridge circuit on the one side 31 of the substrate 30, the one side 44 of the mechanical stop member 43 has a number of recesses, or reliefs, 76 shown in FIG. 5. The recesses 76 are adjacent to more sensitive elements of the electrical bridge circuit, for example, areas in the circuit where conductive polymer jumpers 53 are used to selectively connect resistors on the transducer element 22.

A base housing member 58 contains the electrical conductors 24 which are secured to the base housing member 58 in a known manner. Further, the insulated wires 27 contained in cable 28 are pressed into insulation separating grooves on tile lower ends 26 of the electrical conductors 24 thereby creating an electrical contact between the conductor in the wires 27 and their respective electrical conductor 24. The mechanical stop member 43 contains a number of holes 60 which are dimensioned and positioned to receive the upper ends 25 of the electrical conductors 24 as the base housing member 58 is moved into alignment and contact with the mechanical stop member 43, as best shown in FIGS. 1 and 2. The base housing member 58 contains four alignment pins 64 which are received by mating alignment sockets 66 in the mechanical stop member 43. As the alignment pins 64 are pushed into engagement with the alignment sockets 66, that engagement is effective to connect the base housing member 58 to the mechanical stop member 43. Connecting the base housing member 58 to the mechanical stop member 43, pushes the upper ends 25 of the electrical conductors 24 into a contacting relationship with contact pads on the lower side of the substrate 30.

As the fluid pressure causes the diaphragm 36 to deflect toward the one side 44 of the mechanical stop member 43, it is important that an air pressure force not build up between the one side 31 of the diaphragm 30 and the one side 44 of the mechanical stop member 43. Any change in air pressure over ambient air pressure could adversely impact the accuracy with which the strain gauge 37 is measuring the fluid pressure force being exerted on the opposite side 32 of the diaphragm 36. Therefore, the holes 60 in the mechanical stop member 43 are of sufficient size to permit the passage of air from the depression 46 through the holes 60 and into a space between the mechanical stop member 43 and the base housing member 58. Further, the peripheral lower edge of the mechanical stop member 43 has a tongue 70 which engages a peripheral groove 72 on the upper peripheral edge 74 of the base housing member 58. The engagement of the peripheral tongue 70 into the peripheral groove 72 is not air tight; and therefore, a pressure differential from ambient air pressure will not occur within the space between the base housing member 58 and the mechanical stop member 43 because of air flow through the joint created by the peripheral tongue 70 and the peripheral groove 72.

To further protect the pressure transducer from excessive pressures during use, a supplementary fluid pressure relief valve is provided on the stem of the housing member 12 which has a radial through-hole 78 covered by an elastic band 80. Excessive fluid pressures will push the elastic band 80 away from the radial hole 78 thereby permitting fluid to leak out of the fluid path housing member and relieving the excessive fluid pressure.

In use, the pressure transducer 10 may be used to continuously monitor blood pressure by connecting the pressure transducer to a catheter inserted into the vascular system of a patient. The catheter is filled with a saline solution to form a static column by which blood pressure is transmitted through the catheter line. The pressure transducer 10 detects blood pressure and transduces the blood pressure into an electric signal. The electric signal is used by other equipment to provide numeric and/or graphic representations of the blood pressure. Normal slight handling or slight motion of the pressure transducer during use does not result in excessive spurious pressure readings because the sensor element is mechanically isolated from the housing with the spacer 41. Further, the mechanical stop provided by the mechanical stop member 43 protects the sensor element from overdeflecting in response to pressure shock waves that may be introduced into the fluid system. Fluid in the system is prevented from migrating through the alumina sensor element by the thin layer of silicone gel applied in the area of the diaphragm. The above features permit the use of less expensive thick film technology to provide a blood pressure monitor that is disposable. Further, when a new transducer is required, because all of the balancing and sensitivity adjustments are self contained within the pressure transducer and preset, no balancing or sensitivity adjustments are necessary before the transducer is used.

While the present invention has been set forth by a description of the preferred embodiment in considerable detail, it is not intended to restrict or in any way limit the claims to such detail. Additional advantages and modifications will readily appear to those who are skilled in the art. For example, while alumina was chosen for the substrate 30 and support member 34 comprising the transducer element 22, zirconia or other material may also be used to provide a substrate material supporting the deposited resistive inks to define a strain gauge. The strain gauge may be designed such that the patch-in resistors formed on the diaphragm with the measuring resistors are sized to be connected in series with the measuring resistor. Alternatively, the patch-in resistors may be connected to the measuring resistor in a combination of parallel and serial connections. The invention may be used to provide a strain gauge that is comprised of only a single measuring resistance network. The pressure transducer housing members are made of a polycarbonate material, but other materials may be used. Further, the present invention illustrates all of the resistances on a single substrate, however, the resistances could be put on multiple substrates, thereby separating them and making individual substrates more compatible with performance requirements. The mechanical stop member may be flat instead of concave, and the stop member may be integrated into the structure of the pressure transducer in various different ways. The invention in its broadest aspects is therefore not limited to the specific details representative and illustrative examples shown and described. Accordingly, departures may be made from such detail without departing from the spirit and scope of applicant's general inventive concept.

What is claimed is:

1. In a pressure transducer having a strain gauge including at least one thick film pressure measuring resistor formed on a diaphragm and having a resistance value varying in response to pressure forces flexing the diaphragm, and further including conductors coupled to the pressure measuring resistor by which the pressure forces may be determined by monitoring at the conductors for an electrical signal which varies in relation to changes in the resistance of the pressure measuring resistor, the improvement comprising:

at least one thick film patch-in resistor formed on the diaphragm such that its resistance also varies with flexing of the diaphragm; and structure associated with the pressure transducer to selectively electrically connect the patch-in resistor to the measuring resistor such that the electrical signal being monitored at the conductors is affected without altering resistance values of the measuring and patch-in resistors.

2. In the pressure transducer of claim 1 wherein the electrical signal represents a particular pressure force corresponding to a selected resistance value, the resistance values of the measuring and patch-in resistors being selected such that a resistance value not more than the selected resistance value may be obtained by selective electrical connection of the measuring and patch-in resistors.

3. In the pressure transducer of claim 1 wherein the diaphragm is formed of alumina.

4. The pressure transducer of claim 1 wherein the thick film patch-in resistor is formed on the diaphragm adjacent the pressure measuring resistor.

5. A pressure transducer comprising:

a diaphragm flexing in response to pressure forces; and a strain gauge formed on the diaphragm and including:

a thick film pressure measuring resistor formed on the diaphragm arid having a measuring resistance value changing in response to changes in the pressure forces;

a plurality of thick film patch-in resistors formed on the diaphragm adjacent the pressure measuring resistor and having a plurality of patch-in resistance values changing in response to changes in the pressure forces; and structure for selectively electrically connecting the plurality of patch-in resistors with the measuring resistor to form a thick film measuring resistance network having a network resistance value, whereby selectively connecting the plurality of patch-in resistors with the measuring resistor changes the network resistance value without altering the measuring and patch-in resistance values.

6. The pressure transducer of claim 5 wherein the resistance value of the measuring resistance network is not more than a desired resistance value.

7. The pressure transducer of claim 5 wherein the structure includes contacts for connecting selected ones of the patch-in resistors in parallel with the measuring resistor thereby forming the thick film measuring resistance network.

8. The pressure transducer of claim 5 further comprising a trimming resistor connected in series with the measuring resistance network to form a series resistance network having a resistance value that does not exceed the desired resistance value.

9. The pressure transducer of claim 8 wherein the trimming resistor is a thick film resistor connected in series with the thick film measuring resistance network.

10. The pressure transducer of claim 5 wherein the diaphragm is formed of alumina.

11. The pressure transducer of claim 5 further comprising a support member contiguous with the diaphragm and which is not subject to flexing in response to flexing of the diaphragm.

12. The pressure transducer of claim 11 further comprising a trimming resistor connected in series with the measuring resistance network to form a series resistance network having a resistance value that does not exceed the desired resistance value.

13. The pressure transducer of claim 12 wherein the support member is formed of alumina.

14. The pressure transducer of claim 5 wherein the thick film patch-in resistors are formed on the diaphragm adjacent the measuring resistor.

15. A pressure transducer for measuring a pressure of a bodily fluid comprising:

a substrate having a generally yieldable diaphragm and a generally rigid support member supporting the diaphragm, the diaphragm flexing in response to the pressure of the bodily fluid exerted on one side of the substrate;

a strain gauge located on an opposite side of the substrate and having:

a thick film measuring resistor formed on the diaphragm; and a group of thick film patch-in resistors formed on the diaphragm, the measuring resistor and the group of patch-in resistors having first resistance values changing in response to the diaphragm flexing from the pressure;

means for electrically connecting selected ones of the group of patch-in resistors with the measuring resistor to form a measuring resistance network having a network resistance value, whereby connecting selected ones of the group of patch-in resistors in the measuring resistance network changes the network resistance value without changing the first resistance values of the measuring resistor and the patch-in resistors;

input terminals connected to the strain gauge for providing a source of power; and output terminals connected to the strain gauge for providing an output signal changing as a function of changes in the pressure of the bodily fluid.

16. The pressure transducer of claim 15 wherein the thick film patch-in resistors are formed on the diaphragm adjacent the measuring resistor, 17. The pressure transducer of claim 15 further comprising a thick film trimming resistor formed on the generally rigid support member and connected in series with the measuring resistance network to form a series resistance network.

18. The pressure transducer of claim 17 further comprising four of the series resistance networks connected to form four legs of an electrical bridge circuit.

19. The pressure transducer of claim 18 wherein the electrical bridge circuit is a Wheatstone bridge circuit.

20. The pressure transducer of claim 15 wherein the substrate is ceramic alumina.

21. The pressure transducer of claim 15 wherein the measuring resistors and the patch-in resistors are made from a cermet material.

22. The pressure transducer of claim 21 wherein each of the thick film measuring resistors and thick film patch-in resistors has a gauge factor providing a thermally stable device sensitivity of approximately 5 microvolts/volt/millimeter of mercury.

23. The pressure transducer of claim 22 wherein the thick film measuring resistors and thick film patch-in resistors have a gauge factor of 19±1.

24. The pressure transducer of claim 23 wherein each of the thick film measuring resistors and the thick film patch-in resistors has a gauge factor approximately five times the gauge factor of the thick film trimming resistors.

25. The pressure transducer of claim 17 wherein each of the series resistance networks has a predetermined design resistance value and each of the measuring resistance networks has a design resistance value of approximately 90%±5% of the predetermined design resistance value of a respective series resistance networks.

26. The pressure transducer of claim 25 wherein each of the trimming resistors has a design resistance value of approximately 5.4% of the predetermined design resistance value of a respective series resistance networks.

27. The pressure transducer of claim 26 wherein design resistance value of each of the series resistance networks is approximately 350 ohms, the design resistance value of each of the measuring resistance networks is approximately 333 ohms, and the design resistance value of each of the series resistors is approximately 19 ohms.

28. The pressure transducer of claim 19 wherein the strain gauge further comprises thick film cermet sensitivity resistor networks connected in series between power supply terminals and the Wheatstone bridge.

29. The pressure transducer of claim 15 wherein the means for connecting includes conductive contacts located on the support member, the conductive contacts including a first conductive contact associated with one side of the measuring resistor and second conductive contacts associated with one side of each of the patch-in resistors.

30. The pressure transducer of claim 28 wherein the means for connecting further includes conductors located on the diaphragm and connecting the conductive contacts with respective ends of the measuring and patch-in resistors.

31. The pressure transducer of claim 30 wherein the means for connecting further includes conductive jumpers connected between the first conductive contact and selected ones of the second conductive contacts.

* * * * *

UNITED STATES PATENT AND TRADEMARK OFFICE
CERTIFICATE OF CORRECTION

PATENT NO. : 5,522,266
DATED : June 4, 1996
INVENTOR(S) : Warren B. Nicholson, et al.

It is certified that error appears in the above-indentified patent and that said Letters Patent is hereby corrected as shown below:

Column 8, line 60, after which, insert --the--.

Column 11, line 55, delete "tile" and insert --the--.

Column 13, line 62, delete "arid" and insert --and--.

Signed and Sealed this

Fifteenth Day of July, 1997

Attest:

BRUCE LEHMAN

*Attesting Officer*  *Commissioner of Patents and Trademarks*